(12) United States Patent
Turner

(10) Patent No.: US 7,382,454 B1
(45) Date of Patent: Jun. 3, 2008

(54) SYSTEM AND METHOD FOR OPTICALLY ASSESSING LAMP CONDITION

(76) Inventor: Carl Anthony Turner, 1002 Columbus Ave. South, New Prague, MN (US) 56071

( * ) Notice: Subject to any disclaimer, the term of this patent is extended or adjusted under 35 U.S.C. 154(b) by 82 days.

(21) Appl. No.: 11/526,373

(22) Filed: Sep. 24, 2006

(51) Int. Cl.
H05B 37/03 (2006.01)
H05B 37/04 (2006.01)
H01J 7/42 (2006.01)

(52) U.S. Cl. ............... 356/416; 356/402; 250/226; 315/134; 315/129

(58) Field of Classification Search ............... 356/402, 356/416, 419; 315/129, 134; 250/226
See application file for complete search history.

(56) References Cited

U.S. PATENT DOCUMENTS

| | | | |
|---|---|---|---|
| 3,996,494 A | 12/1976 | Suga | |
| 4,162,429 A | 7/1979 | Elms et al. | |
| 4,207,500 A | 6/1980 | Duve et al. | |
| 4,318,031 A | 3/1982 | Lonseth et al. | |
| 4,348,613 A | 9/1982 | Hormel et al. | |
| 4,473,779 A | 9/1984 | Linder et al. | |
| 4,549,044 A | 10/1985 | Durham | |
| 4,667,187 A | 5/1987 | Volk et al. | |
| 4,707,796 A | 11/1987 | Calabro et al. | |
| 4,759,630 A * | 7/1988 | Yuasa et al. | 356/425 |
| 4,760,609 A | 7/1988 | Tamagaki | |
| 4,810,936 A | 3/1989 | Nuckolls et al. | |
| 4,831,564 A | 5/1989 | Suga | |
| 4,949,018 A | 8/1990 | Siglock | |
| 4,952,972 A * | 8/1990 | Someya | 355/68 |
| 5,019,751 A | 5/1991 | Flory, IV et al. | |
| 5,042,948 A * | 8/1991 | Fletcher | 356/328 |
| 5,075,669 A | 12/1991 | Nakadozono et al. | |
| 5,103,137 A | 4/1992 | Blake et al. | |
| 5,114,372 A * | 5/1992 | Fuchs | 445/3 |
| 5,202,636 A | 4/1993 | Powell | |
| 5,235,252 A | 8/1993 | Blake | |
| 5,274,611 A | 12/1993 | Donohoe | |
| 5,446,277 A * | 8/1995 | Rutter | 250/214 R |
| 5,471,201 A | 11/1995 | Cerami et al. | |
| 5,479,159 A | 12/1995 | Kelly et al. | |

(Continued)

OTHER PUBLICATIONS

Niedermeyer, "Let there be Light!: Part I", http://www.seabay.org/articles/let_there_be_light_1.htm (visited Apr. 28, 2006), pp. 1-6.

(Continued)

Primary Examiner—Gregory J. Toatley, Jr.
Assistant Examiner—Bryan Giglio (57) ABSTRACT

A greater efficiency and cost-effectiveness is achieved by optically assessing the condition of a gas discharge lamp. Herein, a system and method of optically assessing lamp condition includes measuring the intensity of emitted light within two portions of the emitted spectrum. One portion of the lamp's spectrum is selected such that the intensity of emitted light from that portion remains relatively constant as the lamp ages. The second portion of the lamp's spectrum is selected such that the intensity of the emitted light varies measurably as the lamp ages. A ratio is computed between the two intensities. Comparing this ratio to a reference ratio provides information of the relative present condition (i.e., age) of the lamp being tested. Associating the lamp with location data is a further aspect. Important advantages are the ability to predict relative lamp age, and thus avoid both premature lamp replacement and pre-failure lamp cycling.

20 Claims, 6 Drawing Sheets

U.S. PATENT DOCUMENTS

| | | | |
|---|---|---|---|
| 5,569,984 | A | 10/1996 | Holtslag |
| 5,578,998 | A | 11/1996 | Kasprowicz |
| 5,671,324 | A * | 9/1997 | Haji et al. ............... 392/419 |
| 5,854,535 | A | 12/1998 | Hohlfeld et al. |
| 6,028,396 | A | 2/2000 | Morrissey, Jr. et al. |
| 6,072,286 | A | 6/2000 | Sears |
| 6,087,834 | A | 7/2000 | Tury et al. |
| 6,097,191 | A | 8/2000 | Jones, Jr. |
| 6,268,799 | B1 | 7/2001 | Miyashita et al. |
| 6,413,210 | B1 | 7/2002 | Enomoto |
| 6,441,730 | B1 | 8/2002 | Magruder |
| 6,452,339 | B1 | 9/2002 | Morrissey et al. |
| 6,485,301 | B1 * | 11/2002 | Gemunder et al. ........... 433/29 |
| 6,542,082 | B1 | 4/2003 | Nowka et al. |
| 6,556,017 | B1 | 4/2003 | Pettersson |
| 6,583,588 | B2 | 6/2003 | Erhardt |
| 6,713,993 | B2 | 3/2004 | Descombes |
| 6,724,147 | B2 * | 4/2004 | Moench et al. ............. 315/82 |
| 6,734,642 | B1 | 5/2004 | Reverberi |
| 6,784,667 | B2 | 8/2004 | Belenger et al. |
| 6,864,685 | B2 | 3/2005 | Otsuka et al. |
| 6,957,172 | B2 | 10/2005 | Wegerich |
| 6,972,674 | B2 | 12/2005 | Ohmi |
| 7,009,829 | B2 | 3/2006 | Lentz et al. |

OTHER PUBLICATIONS

Niedermeyer "Let there by Light!: Part III", http://www.seabay.org/articles/let_there_be_light-3.htm (visited Apr. 28, 2006), pp. 1-14.

"Sodium Vapor Lamp", Wikipedia, http://en.wikipedia.org/wiki/Sodium-light (visited Apr. 28, 2006), pp. 1-4.

"Mercury Vapor High Intensity Discharge Light Bulbs from Sylvania", http://www.servicelighting.com/library/light_bulbs_hid_mercury_vapor.cfm (visited Apr. 28, 2006), pp. 1-2, Service Lighting, Inc., Copyright 1996-2005.

"Gas Discharge Lamps, Ballasts, and Fixtures", http://members.misty.com/don/dschlamp.html (visited Apr. 28, 2006), Introduction, Neon Lights and Signs, High Intensity Discharge Lamps, Special Purpose HID Lamps Such as Xenon and HMI.

"Street Light Program", http://www.kemo.org/pubworks.nsf/pub/PWSL3? opendocument, Kansas City, MO Public Works, (visited Apr. 28, 2006), See "Cycling Lamp" paragraph.

"Advance Transformer Ballast—Frequently Asked Questions (FAQs)", http://www.advancetransformer.com/support/faqs.jsp-?pbid=27&showall (visited Apr. 28, 2006), Koninklijke Philips Electronics N.V., © 2006, pp. 1-11.

PAGET (Mill Valley, CA), "Indoor Plant Lighting", http://members.com.net/lmlauman/osp/html/section_iv.html (visited Apr. 28, 2006), The Orchid Seedbank Project, © 2000, Chandler, AZ, pp. 2-18.

"HID—Appendix B Lamp Performance Data" http://www.universalballast.com/techsupport/troubleshooting_guides/hid_b.html (visited Apr. 28, 2006), Universal Lighting Technologies, Nashville, TN, pp. 1-2.

"Currents—An Energy Newsletter for Local Governments," http://www.lgc.org/freepub/PDF/Energy/Currents/09_streetlighting99.pdf, Jun. 28, 2005 (viewed Apr. 28, 2006), Local Government Commission, Sacramento, CA, pp. 1-8.

"Induction Lamp Luminaire Fact Sheet", http://www.bpa.gov/energy/N/projects/conservation_augmentation/pdf/induction_lamp.pdf, Jun. 2003 (viewed Apr. 28, 2006), Bonneville Power Administration.

"HID Troubleshooting Guide" (Crescent Stonco Technical Data), http://www.stoncolighting.com/library/techdata/troubleshooting.pdf, (viewed Apr. 28, 2006), Crescent Stonco, p. 20-278?

"Sylvania Lumalux High Pressure Sodium Lamps" (Data Sheets), http://ecom.mysylvania.com/miniapps/FileNet2/Family Brochures/Lumalux%20Brochure.pdf, © 2003 (viewed Apr. 28, 2006), Osram Sylvania, Danvers, MA, p. 2.

"Instruction Manual for the BIRNS Corona Model 5220 and BIRNS Wet/Dry Ballast Model 3802", Oct. 1, 1998, pp. 4-5, Publication No. MAN-5220-101, BIRNS, Inc., Oxnard, CA.

"High Pressure Sodium Servicing Guide" Oct. 2004, pp. 1-33, American Electric Lighting—Acuity Lighting Group, Inc., © 2004, Conyers, GA.

"High Pressure Sodium Service Checklist," http://www.hubbell-ltg.com/products/psgpage/technical/hps_service.pdf (viewed Jan. 6, 2006) and Apr. 28, 2006), Hubbell Lighting, p. 382.

"High Pressure Sodium Lamps" (A Pacific Energy Center (Factsheet), http://www.pge.com/003-save-energy003c_edu_train/pec/info_resource/pdf/High_Pressure_Sodium_Lamps.pdf, © May 1997 (viewed Apr. 28, 2006) (viewed Dec. 22, 2005), Pacific Gas and Electric Company, pp. 1-4.

* cited by examiner

SYSTEM AND METHOD FOR OPTICALLY ASSESSING LAMP CONDITION

FIELD OF THE INVENTION

The present invention relates in general to assessing lamp condition and, more particularly, to spectral analysis of a lamp's emitted light intensity, over time.

BACKGROUND OF THE INVENTION

Light fixtures (i.e., lights) utilizing high intensity discharge (HID) lamps, such as mercury vapor, metal halide, xenon, high pressure sodium (HPS) and low pressure sodium (LPS) lamps are well-known in the lighting field, and are currently in wide use for area and road way lighting applications in a variety of environments. There are literally millions of these lights in operation throughout the world to light streets and parking lots, industrial spaces, aquariums, gymnasiums, arenas, parks, and many other indoor and outdoor areas. Other types of gas discharge lamps, such as fluorescent, and neon also are widely used in commercial, residential and civic environments. Induction and sulfur lamps are other types of lamps similarly generating light from gas excitation.

A clear arc tube (i.e., a refractory envelope made from, for example, glass, quartz, clear ceramic, etc.) is filled with gasses, such as rare gases and metals. Sodium lamps include an amalgam of metallic sodium, and mercury as a buffer gas for color and voltage control. Small amounts of xenon (or, sometimes, argon plus neon) are used as a "starting gas." A metal halide type lamp is typically filled with argon along with mercury and other metals (e.g., sodium, lithium, thallium, scandium, etc.) in iodine/halogen salt form. A xenon lamp is typically filled with xenon gas. The specific gas mixture used in a particular lamp determines the characteristics of the light emitted therefrom.

The arc tube is often encased within an outer bulb to minimize temperature variations along the arc tube, to reduce oxidation of internal interconnects, to absorb UV light, and to otherwise protect the arc tube. Main (i.e., operating) electrodes, and optional starting electrodes, are enclosed within the arc tube. A starting voltage from a power source is applied from a ballast across the electrodes. The voltage necessary to ignite the arc in the gases is typically derived from a starter circuit connected across an electronic or transformer ballast. Electrons are emitted ionizing one of the fill gasses (e.g., argon) permitting an arc to be established between the main electrodes located across the arc tube. Heat from the arc causes mercury, and/or other materials within the arc tube to vaporize, increasing metal pressures and resulting in color changes until full output equilibrium is reached. Increased metal pressures cause a decrease in the electrical resistance of the lamp up to some point. Further temperature increases will tend to increase electrical resistance. This start-up process can take several minutes to stabilize.

A fluorescent lamp operates in a somewhat similar manner. A glass tube is filled with low pressure gasses (typically argon or argon-krypton with a small amount of mercury added). Electrodes are located across the tube. The inside of the glass tube is coated or composed of phosphors (e.g., calcium tungstenate, zinc sulfide, zinc silicate, etc.). An electrical voltage of sufficient strength is applied across the tube's electrodes causing electrical current (i.e., an arc) to flow between them. The current is composed of moving electrons which interact with the gas atoms (e.g., mercury) causing some of the atoms to move to a higher energy state. However, these excited energy states are not stable and the electrons quickly drop back down to their original energy levels emitting the excess energy as ultra violet (UV) light. UV light is not in the visible light spectrum. The UV light is absorbed by the phosphors and then reemitted at a different frequency (e.g., light in the visible spectrum). This principle is known as florescence, and different types of phosphors emit visible light at different wavelengths (i.e., colors). HID lamps emit visible spectrum light directly and do not need a coating of phosphors in order to produce visible light.

"Neon lamps" are tubes filled with a variety of low pressure gasses such as neon or mercury vapor (with argon), helium, nitrogen, krypton, hydrogen, xenon, and argon. Colored tubes and/or phosphors are combined with a particular gas mixture and concentration to achieve a light emission of the desired color (i.e., spectrum). They otherwise operate similar to fluorescent lamps.

Induction lamps produce light through use of an induction coil to create a high frequency electromagnetic field inside an electron/ion plasma gas enclosed by a glass housing. The field excites the plasma causing atoms (e.g., mercury) to emit UV light. The UV light interacts with phosphors and is converted to visible light in much the same manner as fluorescent lamps. The absence of electrodes is a beneficial feature of this type of lamp.

Sulfur lamps use a small microwave generator (i.e., magnetron) to excite a gas mixture (e.g., argon and sulfur) in a clear quartz enclosure. The argon gas absorbs energy from the microwaves and then kinetically transfers it to the sulfur molecules, which in turn produce to visible light directly. The atoms or molecules of another type of gas discharge lamp are ionized by a radio frequency in proximity to the arc tube.

The lumen (lm) is the SI unit of luminous flux. A standard 100 watt incandescent light bulb emits approximately 1,700 lumens.

Although lamps have a relatively long lifespan, they eventually fail over time. HID and fluorescent lamps exhibit undesirable behaviors as they approach failure, from flickering (e.g., fluorescent, etc.) to exploding (e.g., metal halide, etc.). As certain HID lamps age, their internal resistance increases requiring higher voltages and currents to start, and sustain, the lamp's arc. Electrode depletion and deposition of the electrode material on the interior of the arc tube darkens the tube, resulting in less light emission, increasing heat retention and gas pressure. Internal resistance increases as temperature rises. Eventually the internal resistance exceeds the voltage and current capabilities of its ballast and/or power supply. The lamp can no longer maintain a continuous arc and ceases to operate.

Prior to complete failure the light may cycle on and off repeatedly, igniting and operating until heating increases internal resistance to the point of shut-off, then cooling down until resistance decreases to a point where the lamp can re-ignite. Start-up time, and the required start-up voltage, increases as the lamp ages. The lamp may successfully operate intermittently, continually flash on then off, or continuously attempt to start without success. This repetitive on/off process is known as "drop-out" or "cycling" and occurs over and over until eventually either the lamp is no longer capable of sustaining an arc at the supplied voltage or some other component of the lamp is damaged (e.g., from high or prolonged starting currents and/or voltages). Cycling can be an indication of a lamp's impending end-of-life. As the lamp ages and deteriorates, the "on" time gets progressively shorter. Cycling can be visually distracting or annoying, especially in residential areas. Electromagnetic noise is generated during arc striking, and cycling can result in communication, radio and television frequency interference.

Cycling is not always easy to detect and correct in a quick and cost-effective manner. Failing HID and other lamps waste energy since ballasts remain energized when the lamp is cycled off. A cycling lamp may remain lit for several minutes or more before it heats up, loses its arc and attempts to restart. This may require a service person to visually monitor individual lamps for more then just a brief period of time in order to discover whether cycling is occurring. This is particularly problematic in outdoor applications where lights are widely spaced from one another. Many of these lamps are owned and/or maintained by utilities or governmental entities that have thousands of HID lamps in operation. Manual lamp observation is labor intensive, and thus not a particularly cost-effective means for detecting when lamps are nearing, or in, the cycling phase of a lamp's life cycle. In addition, cycling is often only apparent at night since outdoor lighting normally does not operate during the day. Light owners typically do not have large numbers of service personnel constantly checking lamps at night. As a result, cycling may continue for extended periods of time and often until someone notices the misoperation, is sufficiently inconvenienced by it, and complains to maintenance personnel. Dispatching maintenance personnel in response to the failure of a single lamp is expensive and inefficient, considering that each lamp will ultimately fail and require its own individually-scheduled maintenance visit. Power supply voltage transients and fluctuations also impact lamp cycling too. Service personnel responding to a reported lamp outage may find that the lamp has since cycled on and not be able to accurately locate the "failed" fixture or decide not to replace it.

Cycling is initially correctable by simply replacing a depleted lamp. However, if a cycling condition is allowed to continue over a period of time, it can eventually damage the lamp's starter, ballast and/or other light component(s). As the lamp's internal resistance increases, corresponding higher applied voltage is required for starting and operating the lamp. Ultimately the lamp voltage can no longer maintain a continuous arc. High currents/voltages can damage or degrade a starter, a ballast, or another portion of the light's electrical circuitry. The damaged light cannot operate and the lamp ceases to cycle. When this occurs, the starter, ballast and/or other component(s) must be replaced along with the depleted lamp, resulting in higher overall repair costs. If degradation to the ancillary portions of the light are not detected when a HID lamp is replaced, a second service call may eventually be required when the degraded component ultimately fails. For these reasons, it is desirable to prevent or stop a HID lamp from cycling.

Simply knowing a lamp's calendar age (e.g., calculated from its installation date) and the average life of a particular lamp type, one could schedule a chronologically-determined lamp replacement prior to it reaching the expected cycling phase of the lamp's working life. However, owners/maintenance providers would be required to maintain accurate lamp age records. And the manufacture's estimate of the lamp longevity is only an average expected value. Each lamp's actual longevity will vary from the average expected lifespan. Many lamps will have a useful in-service life that is greater then the manufactures estimated value. Replacing lamps late will not avoid cycling and the accompanying light component stress. Replacing lamps prematurely will result in increased maintenance costs since remaining lamp life is discarded.

Several conventional methods for detecting and/or halting cycling are known. Conventional methods for detecting cycling typically monitor or test an electrical parameter such as voltage, current, power, power factor, and/or resistance magnitude associated with a particular lamp type, ensuring proper values exist for one or more respective magnitude(s). Conventional methods for halting cycling typically provide an electric or mechanical device to interrupt the lamp's power supply subsequent to detection of cycling or abnormal electrical magnitudes. For example, thermal overload protective devices applied to all varieties of electrical equipment are well known. The shut-down light still requires discovery to initiate repair. Other conventional methods provide local (i.e., at the light fixture) indication of likely cycling conditions subsequent to an abnormal voltage/current/resistance magnitude being detected. Another conventional method utilizes a timer energized when the lamp is on, to track the lamp's accumulated operating time as a refinement on the calendar age tracking method. Another conventional method involves temporarily applying an electrical test circuit to the lamp. These conventional methods still rely on someone noticing the light not operating, or its local defect indication, and may also require the failure indication being reported to the owner/maintenance provider. Due to the large quantities of operating HID lights, conventional methods requiring monitoring components added to each light installation may therefore, not yield a cost-effective solution. Likewise, retro-fitting existing light installations with additional monitoring components would entail substantial labor and equipment costs.

Accordingly, there is a need for a more cost-effective and efficient method and apparatus for predicting remaining lamp life, which addresses the aforementioned issues, as well as other related problems.

SUMMARY OF THE INVENTION

In various embodiments, the present invention is directed to an approach for spectral analysis and comparison of the light intensity from an electromagnetic radiation source (e.g., a gas discharge lamp), in a manner that address the aforementioned issues, as well as other related needs in connection with predicting remaining lamp life.

According to one aspect, the present invention provides an approach to optically assessing lamp condition including measuring a first emitted light intensity magnitude of a first light spectrum portion from a gas discharge lamp, measuring a second emitted light intensity magnitude of a second light spectrum portion from the lamp, and computing a ratio between the first magnitude and the second magnitude. The first light spectrum portion is selected such that the first magnitude is relatively constant as the lamp ages, and the second light spectrum portion is selected such that the second magnitude varies measurably as the lamp ages. The ratio is compared to a reference ratio or other reference value.

Another aspect of the present invention provides the ratio computed between the first magnitude and the second magnitude is derived from multiple first and second magnitude measurements.

According to another aspect of the present invention, the method of optically assessing lamp condition further includes measuring a third emitted light intensity magnitude of the first light spectrum portion at time t3, measuring a forth emitted light intensity magnitude of the second light spectrum portion at time t4. The first magnitude is measured at time t1. The second magnitude is measured at time t2. Time t3 is prior to t1, time t4 is prior to t2, and the reference ratio is computed between the third magnitude and the forth magnitude. Time t1 is simultaneous with time t2, and time t3 is simultaneous with time t4, in one configuration of the present invention. In another configuration of the present invention, time t1 is not simultaneous with time t2. In yet another configuration of the present invention, time t3 is not simultaneous with time t4.

According to one aspect of the present invention, the method of optically assessing lamp condition includes measuring the third emitted light intensity magnitude of the first light spectrum portion from a second gas discharge lamp, measuring the forth emitted light intensity magnitude of the second light spectrum portion from the second lamp, and computing the reference ratio between the third magnitude and the forth magnitude. Preferably, the first and second gas discharge lamps are manufactured in a similar manner, and to similar specifications, so as to reasonably expect similar performance characteristics of both gas discharge lamps. The present invention is particularly useful where the second gas discharge lamp has exhausted a known period of its working life, or has a known portion of its working life remaining prior to the onset of cycling.

According to another aspect of the present invention, the method of optically assessing lamp condition includes associating location coordinate data for the first lamp with the ratio between the first and second magnitudes, the location coordinate data being obtained for example using a global position system receiver.

In yet another aspect of the invention, an apparatus for optical lamp condition assessment includes a photosensor arranged and configured for measuring a first emitted light intensity magnitude of a first light spectrum portion from a gas discharge lamp and a second emitted light intensity magnitude of a second spectrum portion from the lamp, and a comparator circuit arranged and configured for computing a ratio between the first magnitude and the second magnitude, the comparator circuit being communicatively coupled to the photosensor. The first light spectrum portion is selected such that the first magnitude is relatively constant as the lamp ages, and the second light spectrum portion is selected such that the second magnitude varies measurably as the lamp ages.

According to another aspect of the present invention, the photosensor includes a first photoresistor shielded by a first optical bandpass filter tuned to the first spectrum portion, and a second photoresistor shielded by a second optical bandpass filter tuned to the second spectrum portion. In one configuration, the comparator circuit includes at least one analog-to-digital converter arranged to receive a signal from each photoresistor, and a microprocessor communicatively coupled to each of the at least one analog-to-digital converters, the microprocessor programmed to compute the ratio. In an alternative configuration, the comparator circuit is an analog signal processing circuit.

In one particular implementation of the present invention, the comparator circuit further includes a memory arranged and configured for storing at least one reference ratio, and the microprocessor being further programmed to compare the ratio to the at least one reference ratio. In one example embodiment of the present invention, the ratio computed between the first magnitude and the second magnitude is derived from data representing multiple first and multiple second magnitude measurements. The memory is arranged and configured for storing the data representing multiple first and second magnitude measurements.

A particular aspect of the present invention is a display communicatively coupled to the comparator circuit, the display being arranged and configured to indicate information about the ratio.

These above-characterized aspects, as well as other aspects, of the present invention are exemplified in a number of illustrated implementations and applications, some of which are shown in the figures and characterized in the claims section that follow. However, the above overview is not intended to describe each illustrated embodiment or every implementation of the present invention.

BRIEF DESCRIPTION OF THE DRAWINGS

Other aspects and advantages of the invention may be more completely understood in consideration of the following detailed description of various example embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims, and equivalents thereof.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention.

In various embodiments, the present invention is generally directed to a method and system for optically assessing lamp condition. The invention is particularly suited for measuring the relative age of a lamp and predicting remaining lamp life. While the present invention is not necessarily limited to high intensity discharge (HID) lamp applications, the invention will be better appreciated using a discussion of exemplary embodiments in such a specific context.

It was discovered that the magnitude of emitted light intensity from an HID lamp changes with various variables such as distance from the lamp, type and cleanliness of lamp lens, angle of incidence between a detector and the lamp, ambient light contamination, and age of the HID lamp, among others. It was further discovered that magnitudes of light intensity for certain portions of the emitted spectrum changed at different rates with ages; while changes in the magnitudes of light intensity for the respective portions of the emitted spectrum changed at relatively constant rates across the spectrum for changes in other variables (i.e., distance, angle of incidence, etc.). Therefore, by comparing portions of the emitted spectrum that change at different rates with age, and normalizing out changes not attributable to age using comparison of portions of the spectrum that remain relatively constant with age, the relative age of a HID lamp can be ascertained. The changes to only certain portions of the emitted light spectrum are correlated with physical changes occurring within the lamp that ultimately lead to, or indicate imminent, failure. For example, the composition of a lamp's electrode changes with age (i.e., some elements are being depleted or modified), thus changing the composition of the emitted spectrum due to the composition from the various elements. The opacity of the lamp's bulb can also change with lamp age due to deposition of material onto the bulb, thus changing the spectrum of light which can escape from the bulb.

It was further discovered that by comparing the differences between respective portions of the emitted light spectrums of multiple lamps (or a lamp at multiple times), changes due to age is determined by observing changes to the spectrum that change with age and normalizing out changes within that portion of the spectrum due to non-age factors by observing changes between portions of the spectrum that should remain relatively constant with lamp age and normalizing out said non-age changes mathematically. Using the relationships between various, relatively steady and relatively variable, portions of emitted light intensity spectrum for similar lamps, changes to a lamp due to age is determined. By comparing one lamp (i.e., a lamp under test) to another of known age (i.e., a reference lamp) for example, the relative condition of the lamp under test is determined with respect to the reference lamp. If the reference lamp is new, then the test lamp's age is determined relative to a new lamp. If the test lamp is know to be at onset of cycling (indicating imminent failure), then the test lamp's age is determined relative to its own probable failure. By the method and apparatus developed from these discoveries, the relative age of HID lamps are easily and accurately determined.

Using the method and/or apparatus of the present invention to determine the relative age of an HID lamp with respect to some age milestone, lamps of a relative age at which cycling is occurring are easily identified. Lamps so identified may then be targeted for replacement or maintenance. As important, using the method and/or apparatus of the present invention, a relative lamp age sufficiently distant from cycling can be confirmed thus permitting premature replacement and/or maintenance to be avoided. Likewise, lamps of light fixtures known to be cycling can be analyzed using the method and/or apparatus of the present invention to determine the lamp itself to be, or not be, the cause of light fixture trouble thus leading technicians to, or away from, other light components as a trouble source.

According to a general example embodiment of the method of the present invention, the magnitude of a characteristic of a first portion of a spectrum and the magnitude of the characteristic of a second portion of the spectrum are generated from an electromagnetic radiation source are measured. The first portion of the spectrum is selected such that the magnitude of the characteristic thereof remains relatively constant as the electromagnetic radiation source ages. However, the magnitude of the characteristic of the first portion of the characteristic may vary as variables other than age change with respect to the electromagnetic radiation source (e.g., distance from the electromagnetic radiation source, power of the electromagnetic radiation source, etc.). The second portion of the spectrum is selected such that the magnitude of the characteristic thereof varies measurably as the electromagnetic radiation source ages. A ratio between the magnitude of the characteristic of the first portion of the spectrum and the magnitude of the characteristic of the second portion of the spectrum is computed and compared to a reference ratio.

According to a more specific example embodiment, the characteristic of interest is the magnitude of light intensity emitted from a lamp being tested. A first portion of the spectrum of light emitted from the test lamp is selected such that the magnitude of the emitted light intensity within the first portion of the spectrum remains relatively constant as the test lamp (i.e., electromagnetic radiation) source ages. A second portion of the spectrum of light emitted from the test lamp is selected such that the magnitude of the emitted light intensity within the second portion of the spectrum varies measurably as the test lamp ages. A ratio between the magnitude of emitted light intensity within the first portion of the spectrum and the magnitude of emitted light intensity within the second portion of the spectrum is computed and compared to a reference ratio. For example, using a reference ratio equivalent to the ratio between the magnitude of emitted light intensity within the same first portion of the spectrum and the magnitude of emitted light intensity within the same second portion of the spectrum of a reference lamp aged to just prior to the onset of cycling, the performance of the test lamp is determined relative to a lamp about to fail (i.e., the reference lamp). Similarly, using a reference ratio equivalent to the ratio between the magnitude of light emitted within the same first portion of the spectrum and the magnitude of emitted light intensity within the same second portion of the spectrum of a new reference lamp which is new, the performance of the test lamp is determined relative to a new lamp far away from failing (i.e., the new reference lamp). Thus the test lamp's relative age between new and failure is ascertained.

Test data of a similar electromagnetic radiation source is used to determine which portions of the spectrum to select for the respective measurements. The first portion of the spectrum, selected such that the magnitude of the characteristic thereof remains relatively constant, is used to normalize the measurement of the magnitude of the characteristic of the second portion of the spectrum generated from an electromagnetic radiation source in order to offset influences attributable to variables other than age. Selecting the first portion of the spectrum and the characteristic being measured, such that the magnitude of the characteristic remains relatively constant as the electromagnetic radiation source ages improves the accuracy of the method. If the first portion of the spectrum and the characteristic being measured are selected such that they remain exactly constant with age, than any changes in the ratio are attributable solely to variables other than age.

The range of the spectrum portions and the characteristic being measured both impact whether the characteristic does or does not change with age. For the magnitude of the characteristic of the first portion of the spectrum to remain relatively constant does not mean that it is absolutely constant with age, but rather that it changes little compared to changes occurring with age to the characteristic of the second portion of the spectrum. In other words, there must be measurable variation in the characteristic of the second portion of the spectrum with respect to the variation in the characteristic of the first portion of the spectrum. It is the relative, not the absolute, change which is important. Measurable variation is also relative to the precision of the measuring device in detecting changes to the magnitude of the characteristic being measured in each of the first and second portions of the spectrum. The characteristic being measured and spectrum portions from which the characteristic is being measured are appropriately selected so that the respective characteristics can be sufficiently to be measured.

According to a more specific general example embodiment of the method of the present invention, the magnitude of emitted light intensity of a first portion of a light spectrum and the magnitude of emitted light intensity of a second portion of the light spectrum generated from a lamp are measured. The first portion of the light spectrum is selected such that the magnitude of the emitted light intensity thereof remains relatively constant as the lamp ages; however, the magnitude of emitted light intensity may vary as variables other than age change with respect to the lamp such as distance from the lamp or power (wattage) of the lamp, etc. The second portion of the light spectrum is selected such that the magnitude of the emitted light intensity varies measurably as the lamp ages. A ratio between the magnitude of the emitted light intensity of the first portion of the spectrum and the magnitude of the emitted light intensity of the second portion of the spectrum is computed. According to another embodiment, the ratio is compared to a reference ratio.

Utilizing a reference ratio computed as the ratio between the magnitude of the emitted light intensity of the first portion of the spectrum and the magnitude of the emitted light intensity of the second portion of the spectrum of a similarly manufactured light which has exhausted a known period of its working life (i.e., a new lamp which has used 0% of its working life, etc.) indicates the change in condition of the light being presently tested relative to its condition at some known stage of its working life (i.e., new). Utilizing a reference ratio computed as the ratio between the magnitude of the emitted light intensity of the first portion of the spectrum and the magnitude of the emitted light intensity of the second portion of the spectrum of a lamp manufactured in a similar manner to the same specifications, and having a known portion of its working life prior to the onset of cycling remaining, (i.e., determined by previous testing just prior to the onset of cycling) can indicate the condition of the light being presently tested relative to what its condition will likely be just prior to cycling of the similar light. In this manner an indication can be obtain as to how close the light being presently tested is to its own cycling phase. In this manner, the relative age of a lamp's working life can be assessed. Multiple reference ratios determined all along a similar lamp's working life can be determined, and the ratio from the light being presently tested can be compared to multiple reference ratios in order to determine the condition of the light presently being tested along the working life of a similar lamp.

According to another general example embodiment of the method of the present invention, the magnitude of a characteristic of a first portion of a spectrum from an electromagnetic radiation source is measured at time t1. The magnitude of the characteristic of a second portion of the spectrum generated from the electromagnetic radiation source is measured at time t2. The magnitude of the characteristic of the first portion of a spectrum from the electromagnetic radiation source is measured at some time t3 prior to t1, and the magnitude of the characteristic of the second portion of the spectrum generated from the electromagnetic radiation source is measured at some time t4 prior to t2. The first portion of the spectrum is selected such that the magnitude of the characteristic thereof remains relatively constant as the electromagnetic radiation source ages; however, the magnitude of the characteristic of the first portion of the characteristic may vary as variables other than age change with respect to the electromagnetic radiation source (e.g., distance from the electromagnetic radiation source, power of the electromagnetic radiation source, etc.). The second portion of the spectrum is selected such that the magnitude of the characteristic thereof varies measurably as the electromagnetic radiation source ages. A ratio between the magnitude of the characteristic of the first portion of the spectrum (measured at t1) and the magnitude of the characteristic of the second portion of the spectrum (measured at t2) is computed.

According to another general example embodiment of the present invention, the ratio is compared to a reference ratio. The reference ratio is computed between the magnitude of the characteristic of the first portion of the spectrum (measured at t3) and the magnitude of the characteristic of the second portion of the spectrum (measured at t4). Times t1 and t2 need not be simultaneous with each other, but should be reasonably close in time (i.e., the measurements taken at time t1 and t2 may be taken serially in proximity to one another). Likewise, times t3 and t4 need not be simultaneous with each other, but should occur reasonably close in time to one another.

According to the general example embodiment described immediately above, the reference ratio is computed from the same electromagnetic radiation source, but at an earlier time (e.g., when new). Using this method, the present condition of the electromagnetic radiation source can be determined relative to its own previous condition. In this way, manufacturing, installation or other variances between similar electromagnetic radiation sources are eliminated.

According to another general example embodiment of the optical lamp condition assessment system of the present invention, at least one electromagnetic radiation sensor for receiving electromagnetic radiation from an electromagnetic radiation source is communicatively coupled to a comparator circuit. The electromagnetic radiation sensor is arranged and configured for measuring a first magnitude of at least one characteristic (e.g., light emission) of the electromagnetic radiation source (e.g., a gas discharge lamp), and for measuring a second magnitude of the characteristic (e.g., light emission) of a second spectrum portion from the electromagnetic radiation source. The first spectrum portion is selected such that the first magnitude is relatively constant as the electromagnetic radiation source ages, and the second spectrum portion is selected such that the second magnitude varies measurably as the electromagnetic radiation source ages. The magnitude of the characteristic of the first portion of the characteristic may vary as parameters other than age change with respect to the electromagnetic radiation source (e.g., distance from the electromagnetic radiation source, power of the electromagnetic radiation source, etc.). The comparator circuit is configured and arranged for receiving and processing a signal representative of the first and second magnitudes, and for computing a ratio between the first and second magnitudes.

According to another general example embodiment of the optical lamp condition assessment system of the present invention, the comparator circuit is further configured and arranged for comparing the ratio to at least one reference ratio.

According to another general example embodiment of the optical lamp condition assessment system of the present invention, at least one electromagnetic radiation sensor includes a first photoresistor optically shielded by a first optical filter tuned to the first spectrum portion (e.g., low pass, bandpass, high pass, etc.), and a second photoresistor optically shielded by a second bandpass filter tuned to the second spectrum portion (e.g., low pass, bandpass, high pass, etc.).

According to another general example embodiment of the optical lamp condition assessment system of the present invention, the comparator circuit includes at least one analog-to-digital converter arranged to receive a signal from each photoresistor and a microprocessor communicatively coupled to each of the at least one analog-to-digital converters, the microprocessor programmed to compute the ratio.

According to one aspect of the present invention, a display is coupled to the comparator circuit, the display being configured and arranged to receive a signal from the comparator circuit representative of the processing results and indicate the results.

According to another general example embodiment of the optical lamp condition assessment system of the present invention, the comparator circuit is an analog signal processing circuit, for example, a resistive voltage divider circuit, or comparator function developed using operational amplifiers as is well know in the art.

According to another general example embodiment of the optical lamp condition assessment system of the present invention, the comparator circuit includes an analog-to-digital converter arranged to receive a signal from the electromagnetic radiation sensor and a microprocessor communicatively coupled to the analog-to-digital converter, the microprocessor programmed to compute the ratio.

According to another general example embodiment of the optical lamp condition assessment system of the present invention, the comparator circuit further includes a memory arranged and configured for storing at least one reference ratio, the microprocessor being further programmed to compare the ratio to the at least one reference ratio.

According to another general example embodiment of the optical lamp condition assessment system of the present invention, the ratio computed between the first magnitude and the second magnitude is derived from data representing multiple first and second magnitude measurements, the memory being further arranged and configured for storing the data representing multiple first and second magnitude measurements.

According to another general example embodiment of the optical lamp condition assessment system of the present invention, the optical lamp assessment system is optically coupled with a pole-mounted high intensity gas discharge lamp. According to one aspect, the optical lamp assessment system is affixed to the same pole as the lamp.

In describing the following particular example embodiments of the present invention, reference will be made herein to the figures of the drawings in which like numerals refer to like features of the invention.

Figure 1:
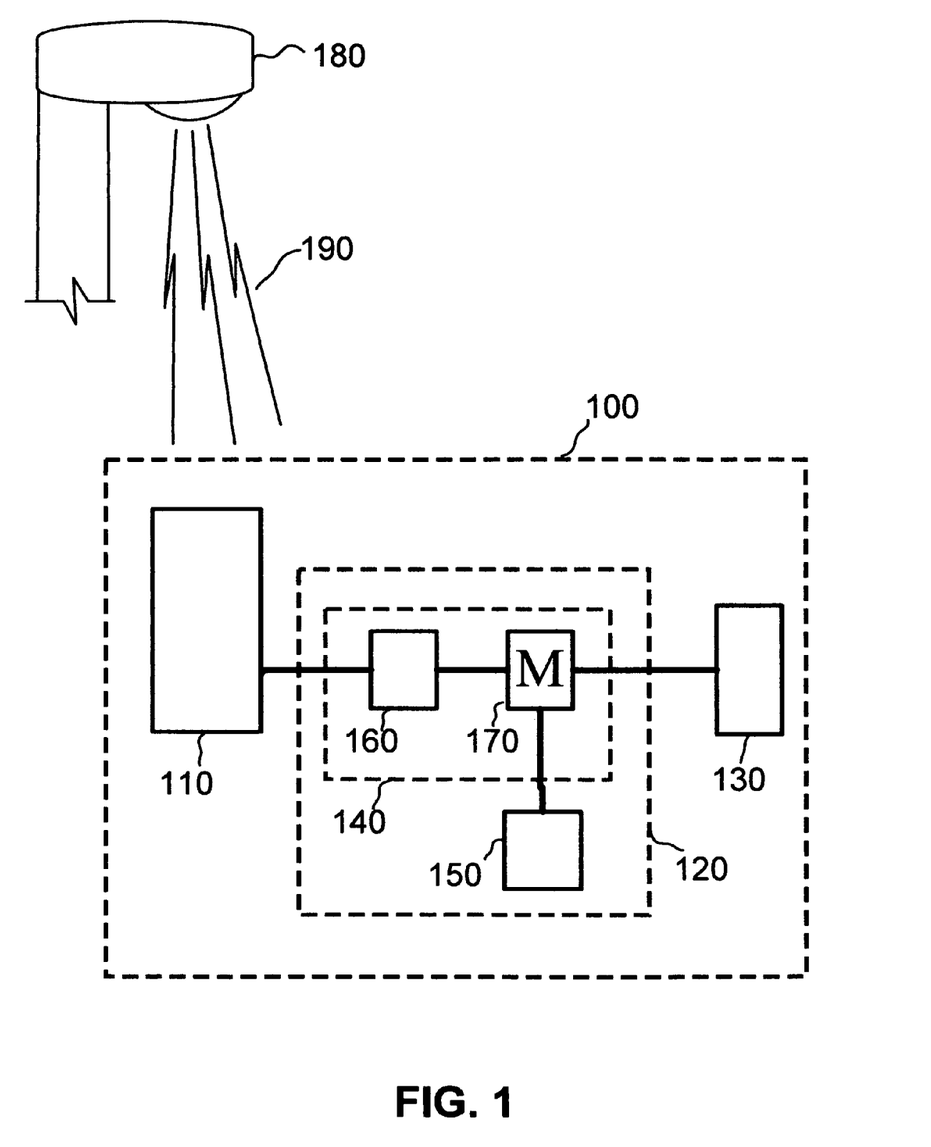
FIG. 1 is a schematic representation of a system for optically assessing lamp condition having a single photodetector in accordance with an example embodiment of the present invention.

Referring now to the figures, FIG. 1 shows an example embodiment of the present invention. In this embodiment, a system for optically assessing lamp condition 100 comprises an electromagnetic radiation sensor 110 (a light intensity sensor for example) communicatively coupled to a comparing circuit 120, which in turn is communicatively coupled to a display 130. The comparing circuit 120 comprises a signal processing circuit 140 communicatively coupled to a memory circuit 150. The components of the system 100 are implemented in order to facilitate analog communication signals therebetween in one example embodiment, or to facilitate digital communication signals therebetween in another example embodiment, or to facilitate a combination of analog and digital communication signals therebetween in other embodiments as shown in FIG. 1. Signal processing circuit comprises an analog-to-digital converter 160 communicatively coupled to a microprocessor 170, the memory circuit 150 being communicatively coupled to the microprocessor 170.

Light 180 emits electromagnetic radiation 190 which strikes the electromagnetic radiation sensor 110. Sensor 110 produces a signal representative of the magnitude of emitted light corresponding to various wavelengths. Those skilled in the art will recognize multiple ways in which photosensor 110 and comparing circuit 120 can be arranged and configured to interact with each other to accomplish the necessary monitoring and communicating functions of the present invention. For example, optical band pass filtering can be accomplished by mechanical filters within photosensor 110, and/or via signal processing techniques by comparing circuit 120.

Figure 2:
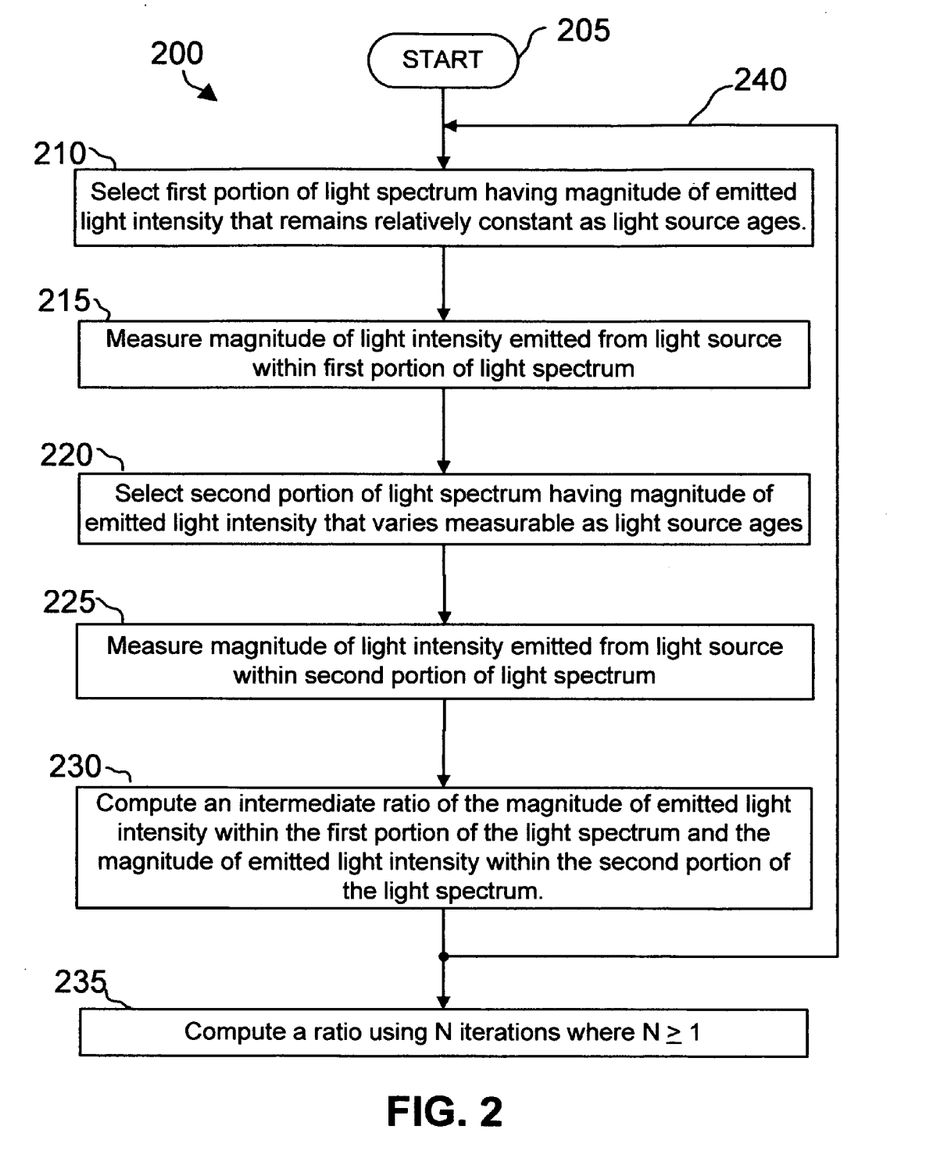
FIG. 2 is a block diagram illustrating a method for optically assessing lamp condition, in accordance with an example embodiment of the present invention.

FIG. 2 illustrates one example embodiment of the method of the present invention 200. The process is initiated at START 205 for the first time ($T_1$). At step 210 a first portion of the spectrum of light emitted from the test lamp is selected such that the magnitude of the emitted light intensity within the first portion of the spectrum remains relatively constant as the test lamp (i.e., electromagnetic radiation) source ages. At step 215 the magnitude of the light emitted from the light source within the first portion of the spectrum is measured. At step 220 a second portion of the spectrum of light emitted from the test lamp is selected such that the magnitude of the emitted light intensity within the second portion of the spectrum varies measurably as the test lamp ages. At step 225 the magnitude of the emitted light intensity from the light source within the second portion of the spectrum is measured. At step 230 an intermediate ratio between the magnitude of emitted light intensity within the first portion of the spectrum and the magnitude of emitted light intensity within the second portion of the spectrum is computed.

Optionally, the process of selecting and measuring each portion of the spectrum is iterated multiple (N) times via feedback path 240 used to obtain a ratio in step 235. The ratio of step 235 is computed from one (1) iteration of steps 210 through 230 in the simplest example embodiment of the present invention. In alternative example embodiments, multiple intermediate ratios computed at step 230, determined respectively from multiple iterations of steps 210 through 230, are used to develop a ratio at step 235. Various computational methods are used in determining the ratio of step 235 from one or more intermediate ratios from step 230, including but not limited to, averaging (i.e., an intermediate ratio is computed for each iteration at step 230, which are used to compute an average ratio at step 235 using the multiple intermediate ratios from each of the iterations of step 230), discarding a certain number of high and/or low intermediate ratios computed at step 230 and averaging the rest of the step 230 intermediate ratios in computing the step 235 ratio, determining the step 235 ratio as the mean of the intermediate ratios computed at multiple step 230 iteration, etc.

Figure 3:
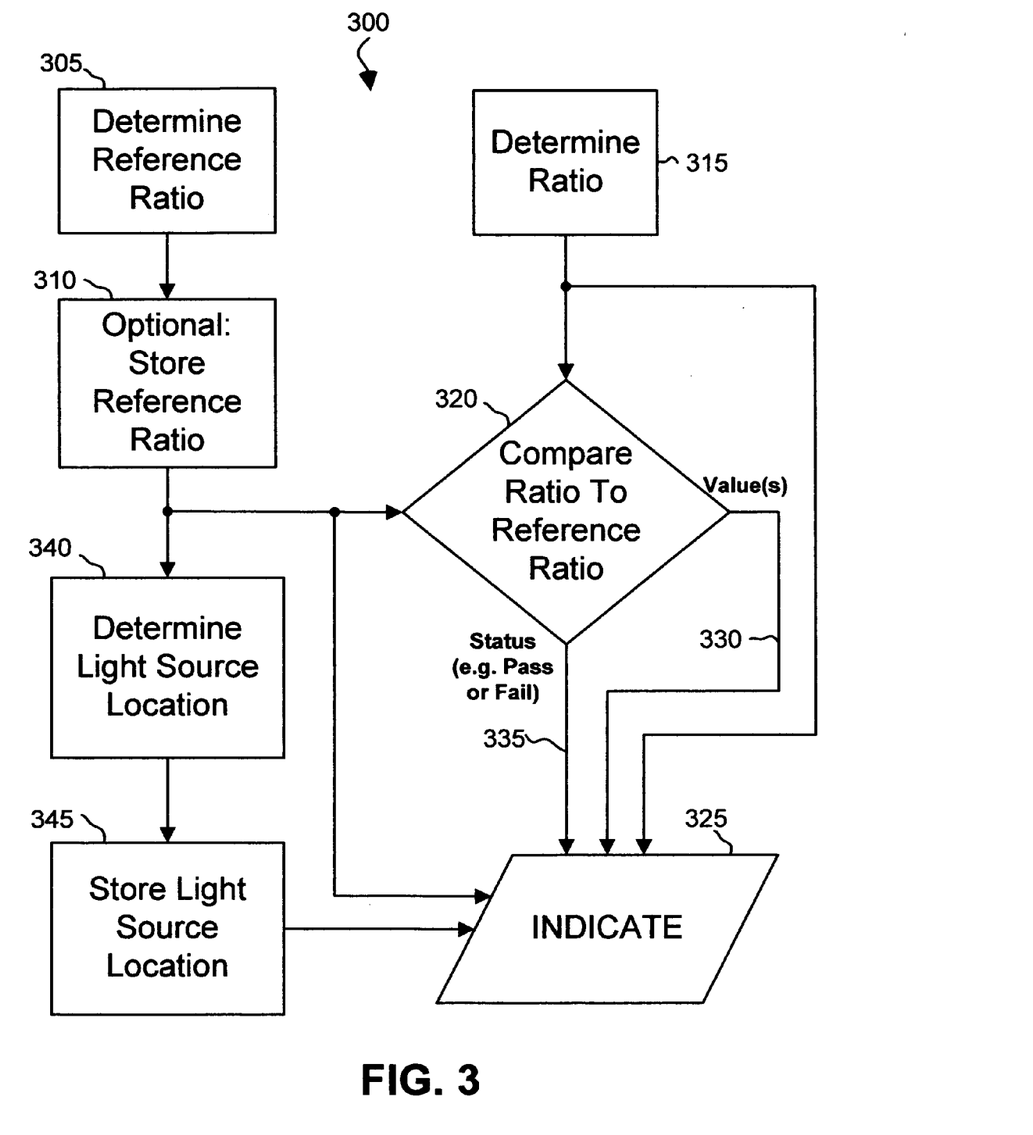
FIG. 3 is a block diagram illustrating a further method for optically assessing lamp condition, in accordance with an example embodiment of the present invention.

FIG. 3 illustrates a further example embodiment of the method of the present invention 300. At step 305, a reference ratio is determined, and optionally stored for further reference at step 310. The reference ratio is determined by measurement in one example embodiment of the present invention, such as by the process set forth in FIG. 2 for example, except that the steps are performed on a reference lamp (i.e., of known relative age or specific condition), or performed on the lamp for which the ratio (step 315) is being determined but at some previous time.

For example, determining a reference ratio equivalent to the ratio between the magnitude of emitted light intensity within the same first portion of the spectrum as used in determining the ratio (step 315) and the magnitude of emitted light intensity within the same second portion of the spectrum of a reference lamp aged to just prior to the onset of cycling, the ratio of a lamp being presently tested can be determined relative to the reference ratio of a lamp about to fail (i.e., the reference lamp). Similarly, using a reference ratio equivalent to the ratio between the magnitude of emitted light intensity within the same first portion of the spectrum as used in determining the ratio (step 315) and the magnitude of emitted light intensity within the same second portion of the spectrum of a reference lamp which is new, the present performance of a test lamp is determined relative to a new lamp having a relative age far away from failure. Thereby, the test lamp's relative age between new and failure is ascertained.

According to another example embodiment of the present invention, the reference ratio was previously determined from the same lamp for which the ratio is presently being determined (i.e., at some previous time such as when it was new, or at the last maintenance inspection interval).

According to another example embodiment of the present invention, the reference ratio is computed without using actual measurements, for example from lamp design information.

At step 315 a ratio is determined by the steps set forth for method 200. The ratio is determined either after, before or simultaneous to determining the reference ratio according to respective alternative example embodiments of the present invention. The ratio and reference ratio are compared at step 320 and the result indicated at step 325. At step 325 indication is made of the comparison, either of relevant values 330, or of a pass/fail or other status signal 335. According to one example embodiment, the comparison of step 320 is numerical, for example by dividing the ratio by the reference ratio, yielding value(s) proportional to the comparison, said values being indicated at step 325. According to another example embodiment, the result of the comparison is simply a status, such as pass or fail, said status being indicated. In yet another example embodiment, both numerical and status results of step 320 comparison result and are indicated. In addition, the ratio from step 315 and/or the reference ratio from step 310 are indicated for manual comparison according to an example embodiment of the present invention.

According to an alternative example embodiment, results of the step 320 comparison are stored (not shown) for future indication or output.

Other optional steps of method 300 include determining 340 and storing 345 location information corresponding to the light source being tested.

Referring again to FIG. 1, photosensor 110 communicates information to the comparing circuit 120 corresponding to a first and second portions of the spectrum emitted from light 180, the first portion of the spectrum being selected such that the magnitude of a particular characteristic thereof remains relatively constant as the electromagnetic radiation source ages and the second portion of the spectrum being selected such that the magnitude of the characteristic thereof varies measurably as the electromagnetic radiation source ages. Photosensor 110 may, or may not, communicate additional information concerning the emitted spectrum to comparing circuit 120 (e.g., information corresponding to the balance of the spectrum outside the first and second portions, etc.). According to one implementation, photosensor 110 is arranged and configured such that it is only responsive to the first and second portion of the entire emitted light spectrum 190, such as by use of filters, digital sampling, or other frequency selective hardware or methods known to those skilled in the art.

If necessary, comparing circuit 120 is arranged and configured, or programmed, to appropriately select the information corresponding to the first and second portions of the entire spectrum for further processing, and compute a ratio between the magnitude of the characteristic of the first portion of the spectrum and the magnitude of the characteristic of the second portion of the spectrum. Optionally, comparing circuit 120 is arranged and configured, or programmed, to compare to a reference ratio, which may, for example, be stored or set in memory circuit 150. The computed ratio, and/or the results of the comparison of the computed ratio with the reference ratio is communicated to display 130 and indicated there for human interface.

Figure 4:
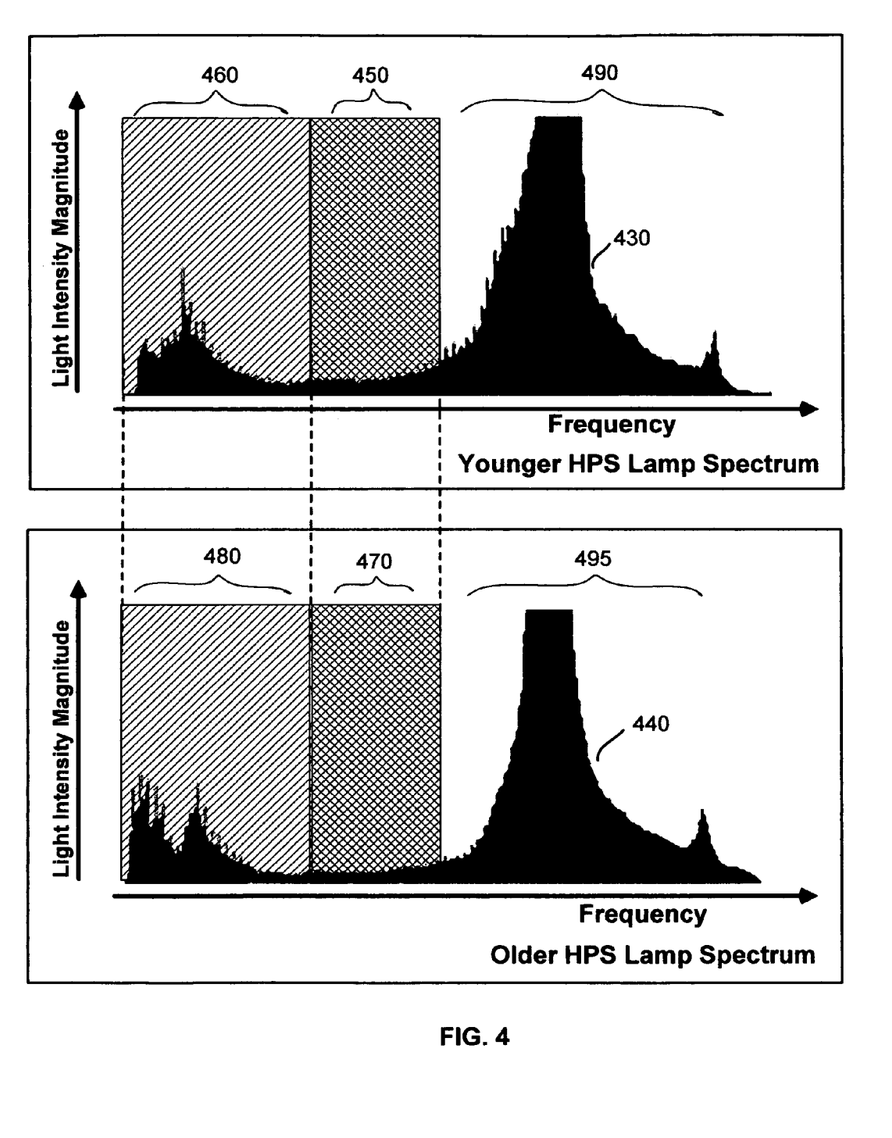
FIG. 4 illustrates spectral power distribution for typical new and old high-pressure sodium lamps.

FIG. 4 illustrates the spectral power distribution (i.e., emitted light intensity spectrum) from respective high pressure sodium (HPS) lamps. Spectrum 430 is of an HPS lamp of relatively younger age, and spectrum 440 is of a similar BPS lamp of relatively older age. Increasing frequency is plotted along the horizontal X-axis of each trace, and the magnitude of emitted light intensity is plotted along the vertical Y-axis. Each spectrum is broken down into three areas: (1) A first portion of each spectrum (frequency range 450 for spectrum 430, and frequency range 470 for spectrum 440) which remains relatively constant in magnitude as this type HPS lamp (i.e., electromagnetic radiation source) ages—indicated by little magnitude change from the younger HPS lamp to the older HPS lamp; (2) A second portion of each spectrum (frequency range 460 for spectrum 430, and frequency range 480 for spectrum 440) which varies measurably in magnitude as this type HPS lamp (i.e., electromagnetic radiation source) ages—indicated by noticeable magnitude changes within the second portion of the spectrum between the younger HPS lamp to the older HPS lamp; and (3) the balance of the spectrum other than the first and second portions (frequency range 490 for spectrum 430, and frequency range 495 for spectrum 440).

Notice that although the first portion remains fairly steady for each respective spectrum, its magnitude does change slightly from the younger to the older lamp. These changes in magnitude may be due to factors in addition to age, such as changing distance from the lamp at which each respective measurement is made, or a dirty lens, etc. Age changes emitted light spectrum equally across the spectrum, and unequally within certain portions of the spectrum. Over the life of an HPS lamp, total light output reduces approximately twenty-five percent (25%). One should expect that equal changes in the variable second portion of the spectrum will also include changes unrepresentative of age. Therefore, the ratio of the magnitude of emitted light intensity between the first and second portions of each spectrum are computed (i.e., second (variable) portion magnitude divided by first (steady) portion magnitude) to normalize out any variations not associated with lamp age. The division can be reversed (i.e., steady portion divided by variable portion) in alternative example embodiments, if done consistently. TABLE 1 (below) illustrates the computed ratios for several types of HPS lamps at each of several relative ages: new, mid-life and during cycling. One can easily see that the ratio changes (i.e., increases) for aging lamps.

TABLE 1

(Control) Known Age HPS Bulbs

| Control Test, Given Ratios | New HPS | Mid life HPS | Cycling HPS |
|---|---|---|---|
| GE Lucalox Brand | 82 | 87 | 91 |
| Phillips Brand | 83 | 86 | 90 |

While FIG. 4 illustrates a visual spectral range, as an aid in discussing the method of the present invention, the method of the present invention need not be restricted to applications within the visible light spectrum. The present invention can be configured and arranged to function within any desired electromagnetic radiation spectrum range, including but not limited to, light spectrums within the range visible to humans.

Figure 5:
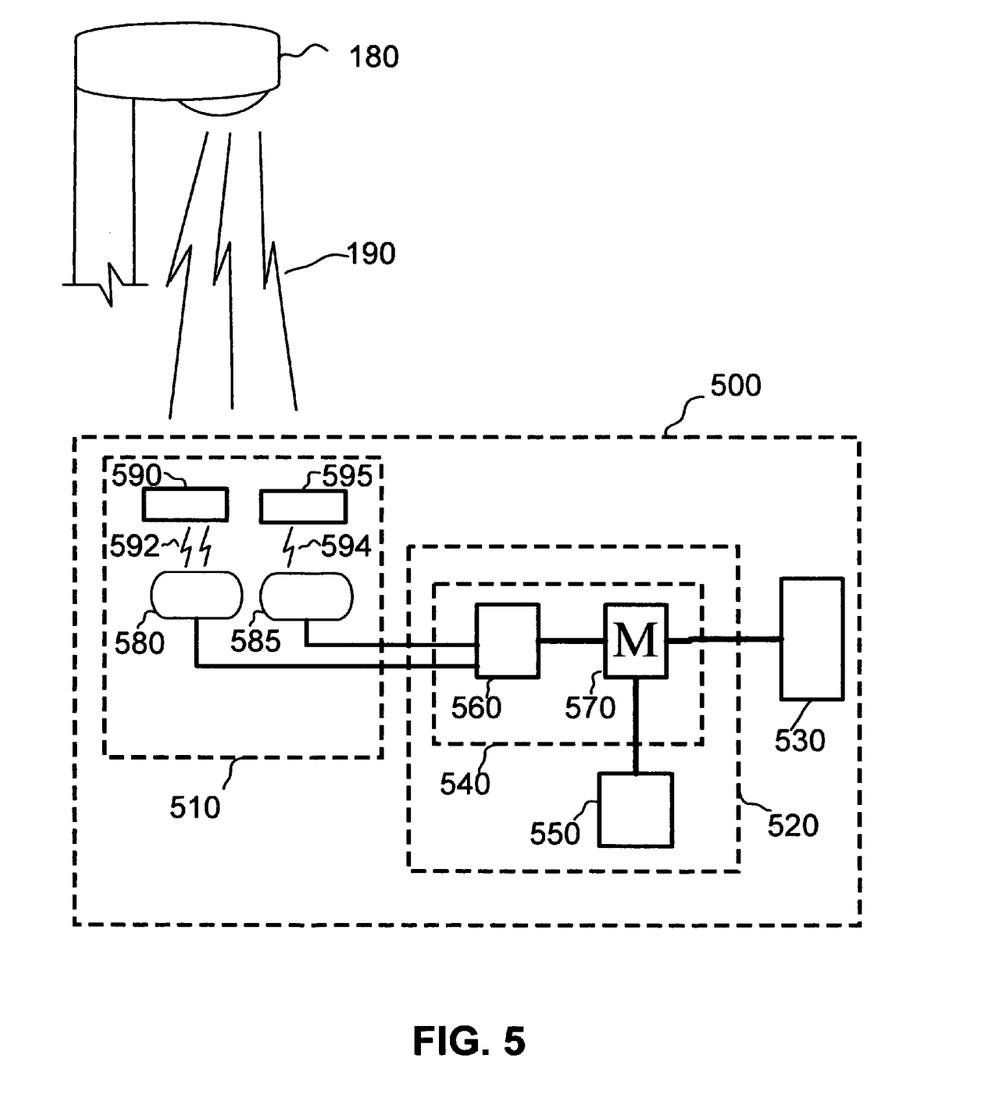
FIG. 5 is a schematic representation of a system for optically assessing lamp condition having multiple filtered photodetectors in accordance with an example embodiment of the present invention.

FIG. 5 shows another example embodiment of the present invention. In this embodiment, a system for optically assessing lamp condition 500 comprises an electromagnetic radiation sensor 510 (e.g., a photosensor) communicatively coupled to a comparing circuit 520, which in turn is communicatively coupled to a display 530. The comparing circuit 520 comprises a signal processing circuit 540 communicatively coupled to a memory circuit 550. As was described for system 100, the components of system 500 are implemented in order to facilitate analog, digital, or a combination of analog and digital communication signals between respective components. FIG. 5 illustrates the signal processing circuit 540 comprising an analog-to-digital converter 560 communicatively coupled to a microprocessor 570, the memory circuit 550 being communicatively coupled to the microprocessor 570.

The electromagnetic radiation sensor 510 is implemented using a first photodetector 580 and a second photodetector 585. First photodetector 580 is shielded by first optical bandpass filter 590 such that a first portion 592 of the spectrum of electromagnetic radiation 590 emitted from light 580 passes through to first photodetector 580. Similarly, second photodetector 585 is shielded by second optical bandpass filter 595 such that a second portion 594 of the spectrum of electromagnetic radiation 590 emitted from light 580 passes through to second photodetector 585. In this manner, the desired first and second portions of the emitted light intensity spectrum are mechanically isolated prior to data capture and communication to a signal processing circuit 520 comprising an analog-to-digital converter 560 communicatively coupled to a microprocessor 570. A memory circuit 550 and display 530 are communicatively coupled to microprocessor 570 for storing and displaying data and results as previously described with respect to similarly-numbered aspects of FIG. 1.

Figure 6:
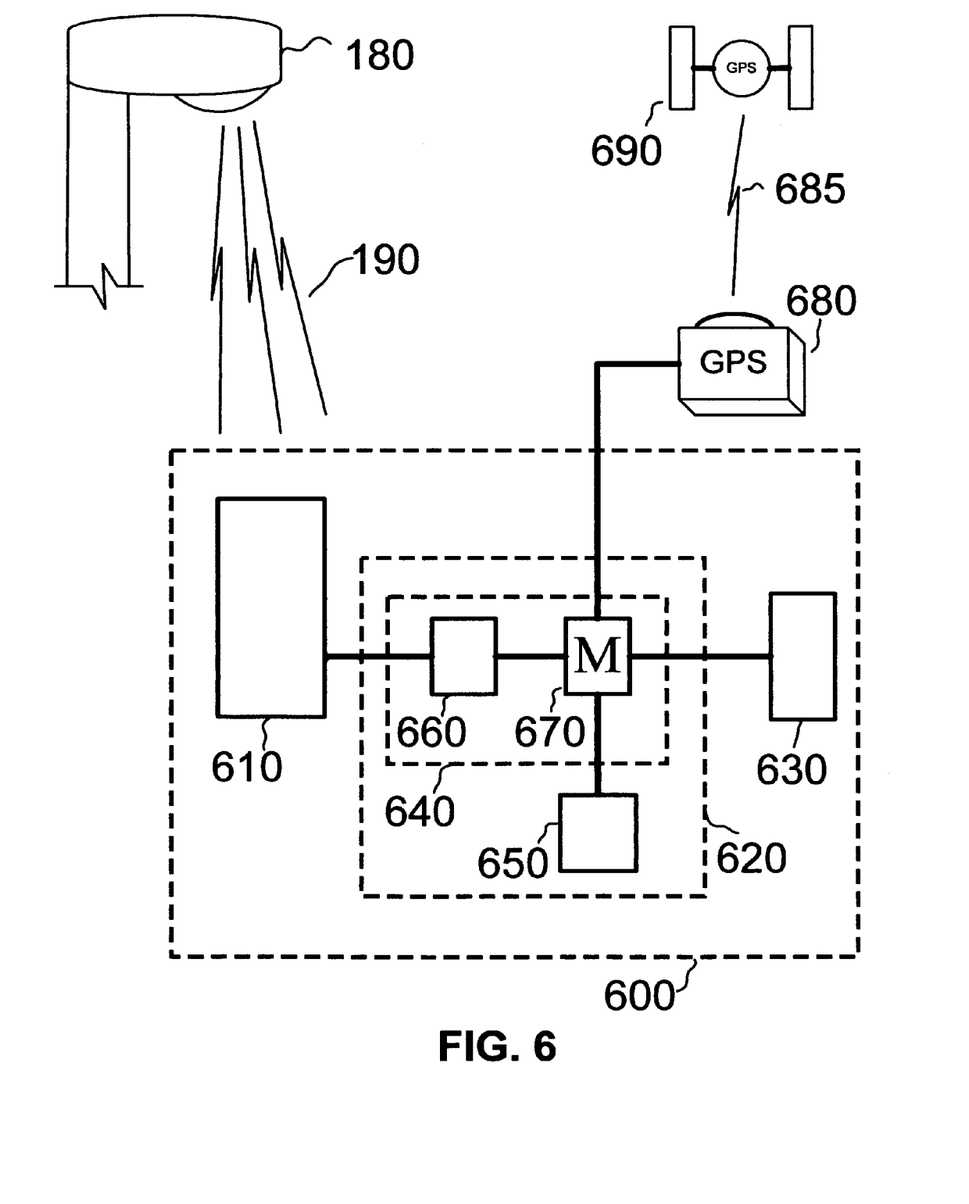
FIG. 6 is a schematic representation of a system for optically assessing lamp condition interfaced with a global positioning system in accordance with an example embodiment of the present invention.

FIG. 6 illustrates a further example embodiment of the present invention. Items 600-670 correspond to similarly numbered 100-series items of FIG. 1. A global positioning system (GPS) receiver is communicatively coupled to microprocessor circuit 670, so that location information corresponding with a particular light 680 under test can be associated with the lamp test results for future reference, for example by storing the location information in memory circuit 650 and linked to the computed ratio and/or measured information for the respective lamp. GPS receiver 680 is communicatively coupled 685 to at least one GPS satellite used to determine location information by well known techniques. Alternatively, lamp location information may be pre-loaded into memory 650, and GPS receiver 680 used to confirm a particular lamp's identity using stored versus measured lamp location information.

According to another example embodiment of the present invention, a focusing mechanism is used in conjunction with electromagnetic radiation sensors to eliminate other light sources other than the lamp being tested (i.e., to attenuate ambient light sources). Ambient light can vary or otherwise contaminate the spectrum of light emitted from a lamp being tested, and thus impact test results. The focusing mechanism shields, and thus removes, ambient light. In an alternative example embodiment of the present invention, a focusing mechanism is employed to concentrate the light emitted from the test lamp, thus diluting the effects of ambient light with the spectrum of interest.

Specific lamp types (e.g., high pressure sodium, mercury vapor, metal halide, low pressure sodium (LPS), etc.) respectively produce distinctive emitted light spectrum as is apparent from the shape. Passing the light generated from a particular type lamp through a known medium, such as a protective lamp lens, modifies the light spectrum since the lens can pass certain portions of the spectrum with less loses than other portions. However, the combination of light plus lens retains a unique spectral signature (i.e., shape). Conversely, it is possible to accurately determine from a lamp spectrum, the type of lamp being tested. The ability to determine the lamp type remotely using its spectrum (e.g., from the ground) negates another reason for having to inspect the lamp at close range. According to another example embodiment of the present invention, a lamp self-recognition feature determines the type of lamp being tested from the lamp's spectral signature, and indicates the lamp type. According to another example embodiment of the present invention, a lamp self-recognition feature determines the type of lamp from the lamp's spectral signature, and an appropriate reference ratio for the type of lamp identified is selected from a library of stored reference ratios of various lamp types. The selected reference ratio is subsequently used for comparison with the ratio being presently measured.

In this manner, the method and apparatus disclosed herein enable and facilitate in-service measurement of relative age (relative useful life) of lamps. The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to combination with other known locating technologies, or implementation using other emitted light intensity magnitude measuring devices.

Accordingly, the present invention provides, among other aspects, a method and apparatus for optically assessing lamp condition. The present invention is not to be necessarily limited to the particular examples described above, but is intended to cover all aspects of the invention as fairly set out in the appended claims, and equivalents thereof. For instance, while a system and method for optically assessing the condition of a gas discharge lamp are illustrated, other systems and methods for assessing the condition of electromagnetic radiation sources can benefit from the above mentioned teachings. Other aspects and embodiments of the present invention will be apparent to those of ordinary skill in the art from consideration of the specification and practice of the invention disclosed herein. It will be appreciated that the present invention may be implemented in a wide variety of alternate and/or equivalent implementations calculated to achieve the same purposes, which may be substituted for the specific embodiments shown and described herein without departing from the true scope and spirit of the present invention. Various modifications, equivalent processes, as well as numerous structures to which the present invention may be applicable will be readily apparent to those of ordinary skill in the art upon review of the present specification. The claims are intended to cover such modifications and devices; therefore, it is manifestly intended that the specification and illustrated embodiments be considered as examples only, and that this invention be limited only by the claims that follow, and the equivalents thereof.

What is claimed is:

1. A method of optically assessing lamp condition, the method comprising:
    measuring a first emitted light intensity magnitude of a first light spectrum portion from a gas discharge lamp;
    measuring a second emitted light intensity magnitude of a second light spectrum portion from the lamp; and
    computing a ratio between the first magnitude and the second magnitude,
    wherein the first light spectrum portion is selected such that the first magnitude is relatively constant as the lamp ages, and the second light spectrum portion is selected such that the second magnitude varies measurably as the lamp ages.

2. The method of claim 1, further comprising:
    comparing the ratio to a reference ratio.

3. The method of claim 1, further comprising:
    comparing the ratio to a reference value.

4. The method of claim 2, further comprising:
    measuring a third emitted light intensity magnitude of the first light spectrum portion at time t3;
    measuring a forth emitted light intensity magnitude of the second light spectrum portion at time t4; and
    computing the reference ratio between the third magnitude and the forth magnitude,
    wherein the first magnitude is measured at time t1, the second magnitude is measured at time t2, time t3 is prior to t1, and time t4 is prior to t2.

5. The method of claim 4, wherein time t1 is simultaneous with time t2, and time t3 is simultaneous with time t4.

6. The method of claim 2, further comprising:
    measuring a third emitted light intensity magnitude of the first light spectrum portion from a second gas discharge lamp;
    measuring a forth emitted light intensity magnitude of the second light spectrum portion from the second lamp; and
    computing the reference ratio between the third magnitude and the forth magnitude.

7. The method of claim 6, wherein the first and second gas discharge lamps are manufactured in a similar manner, and to similar specifications, so as to reasonably expect similar performance characteristics of both gas discharge lamps.

8. The method of claim 7, wherein the second gas discharge lamp has exhausted a known period of its working life.

9. The method of claim 8, wherein the second gas discharge lamp has a known portion of its working life prior to the onset of cycling remaining.

10. The method of claim 7, further comprising:
    associating location coordinate data for the first lamp with the ratio between the first and second magnitudes,
    wherein the location coordinate data is obtained using a global position system receiver.

11. The method of claim 2, wherein the ratio computed between the first magnitude and the second magnitude is derived from multiple first and second magnitude measurements.

12. An optical lamp condition assessment system, comprising:
    means for measuring a first emitted light intensity magnitude of a first light spectrum portion from a gas discharge lamp and a second emitted light intensity magnitude of a second spectrum portion from the lamp; and
    means for computing a ratio between the first magnitude and the second magnitude, the means for computing being communicatively coupled to the means for measuring,
    wherein the first light spectrum portion is selected such that the first magnitude is relatively constant as the lamp ages, and the second light spectrum portion is selected such that the second magnitude varies measurably as the lamp ages.

13. An optical lamp condition assessment system, comprising:
    a photosensor arranged and configured for measuring a first emitted light intensity magnitude of a first light spectrum portion from a gas discharge lamp and a second emitted light intensity magnitude of a second spectrum portion from the lamp; and
    a comparator circuit arranged and configured for computing a ratio between the first magnitude and the second magnitude, the comparator circuit being communicatively coupled to the photo sensor,
    wherein the first light spectrum portion is selected such that the first magnitude is relatively constant as the lamp ages, and the second light spectrum portion is selected such that the second magnitude varies measurably as the lamp ages.

14. The optical lamp condition assessment system of claim 13, wherein the photosensor includes a first photoresistor shielded by a first optical bandpass filter tuned to the first spectrum portion, and a second photoresistor shielded by a second optical bandpass filter tuned to the second spectrum portion.

15. The optical lamp condition assessment system of claim 13 wherein the comparator circuit includes at least one analog-to-digital converter arranged to receive a signal from each photoresistor and a microprocessor communicatively coupled to each of the at least one analog-to-digital converters, the microprocessor programmed to compute the ratio.

16. The optical lamp condition assessment system of claim 15, further comprising:

a display communicatively coupled to the comparator circuit, the display being arranged and configured to indicate information about the ratio.

17. An optical lamp condition assessment system of claim 13 wherein the comparator circuit is an analog signal processing circuit.

18. An optical lamp condition assessment system of claim 13 wherein the comparator circuit includes an analog-to-digital converter arranged to receive a signal from the photosensor and a microprocessor communicatively coupled to the analog-to-digital converter, the microprocessor programmed to compute the ratio.

19. An optical lamp condition assessment system of claim 18, wherein the comparator circuit further includes a memory arranged and configured for storing at least one reference ratio, the microprocessor being further programmed to compare the ratio to the at least one reference ratio.

20. An optical lamp condition assessment system of claim 19, wherein the ratio computed between the first magnitude and the second magnitude is derived from data representing multiple first and second magnitude measurements, the memory being further arranged and configured for storing the data representing multiple first and second magnitude measurements.

* * * * *